(12) United States Patent
Lee et al.

(10) Patent No.: US 7,567,283 B2
(45) Date of Patent: Jul. 28, 2009

(54) ROTARY CAMERA FOR MOBILE COMMUNICATION DEVICE

(75) Inventors: Jin Ho Lee, Incheon (KR); Choong Jae Lee, Gyeonggi-Do (KR); Sang Hoon Shin, Gyeonggi-Do (KR); Sung Woong Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 10/856,629

(22) Filed: May 27, 2004

(65) Prior Publication Data

US 2005/0001922 A1    Jan. 6, 2005

(30) Foreign Application Priority Data

| Jul. 4, 2003 | (KR) | 10-2003-0045333 |
| Jul. 7, 2003 | (KR) | 10-2003-0045750 |
| Aug. 8, 2003 | (KR) | 10-2003-0055063 |
| Aug. 20, 2003 | (KR) | 10-2003-0057601 |
| Aug. 21, 2003 | (KR) | 10-2003-0057911 |

(51) Int. Cl.
*G02B 13/16* (2006.01)
*H04N 5/225* (2006.01)

(52) U.S. Cl. ............... 348/335; 348/373; 348/375; 348/376; 455/575.3

(58) Field of Classification Search ... 455/556.1–556.2, 455/575.1, 575.3–575.4, 73–74; 348/373–376
See application file for complete search history.

(56) References Cited

U.S. PATENT DOCUMENTS

| 6,661,589 B2 * | 12/2003 | Takanashi et al. ............ 359/819 |
| 6,704,586 B2 * | 3/2004 | Park ............................ 455/575.3 |
| 6,785,935 B2 * | 9/2004 | Ahn et al. .......................... 16/221 |
| 6,933,981 B1 * | 8/2005 | Kishida et al. ................. 348/375 |
| 6,975,273 B1 * | 12/2005 | Choi ............................... 343/702 |
| 7,146,200 B2 * | 12/2006 | Park et al. .................. 455/575.3 |
| 7,184,092 B2 * | 2/2007 | Lim ................................. 348/376 |
| 2001/0036845 A1 * | 11/2001 | Park ................................ 455/566 |
| 2003/0044001 A1 * | 3/2003 | Kim ............................... 379/441 |
| 2004/0198433 A1 * | 10/2004 | Lee ............................... 455/556.1 |
| 2005/0119023 A1 * | 6/2005 | Sudo et al. ................... 455/550.1 |

FOREIGN PATENT DOCUMENTS

| EP | 1 324 594 A2 | 7/2003 |
| EP | 1 381 207 A2 | 1/2004 |
| EP | 1 392 038 A1 | 2/2004 |
| JP | 7288861 | 10/1995 |
| JP | 2002-111834 | 4/2002 |
| JP | 2002-372036 | 12/2002 |
| JP | 2003-060764 | 2/2003 |
| KR | 1020030047105 A | 6/2003 |
| WO | WO 02/100077 A1 | 12/2002 |

\* cited by examiner

*Primary Examiner*—James M Hannett
*Assistant Examiner*—Pritham Prabhakher
(74) *Attorney, Agent, or Firm*—Lee, Hong, Degerman, Kang & Waimey

(57) ABSTRACT

A camera that is mountable in a mobile communications device is disclosed. The camera allows the user of the device to precisely adjust the acute rotational angle of the camera with respect to the body of the device and maintains the adjusted angle of the camera until the user deliberately adjusts it again.

12 Claims, 12 Drawing Sheets

ROTARY CAMERA FOR MOBILE COMMUNICATION DEVICE

CROSS-REFERENCE TO RELATED APPLICATIONS

Pursuant to 35 U.S.C. § 119(a), this application claims the benefit of earlier filing date and right of priority to the following, the contents of which are hereby incorporated by reference herein in their entirety:

Korean Application No. 45333/2003, filed on Jul. 4, 2003.
Korean Application No. 45750/2003, filed on Jul. 7, 2003.
Korean Application No. 55063/2003, filed on Aug. 8, 2003.
Korean Application No. 57601/2003, filed on Aug. 20, 2003.
Korean Application No. 57911/2003, filed on Aug. 21, 2003.

BACKGROUND OF THE INVENTION

1. Field of the Invention

The present invention relates to a rotary camera, and more particularly, to a rotary camera rotatably installed on a mobile communications device.

2. Description of the Related Art

As the use of mobile communications devices has increased, such devices have been used for more than mere voice or data communications. The term "mobile communications device," as used herein, refers to mobile telephones, cellular telephones, Personal Communication Systems (PCS), Personal Data Assistant (PDA) devices, laptop computers, and any other device having wireless communication capabilities.

For example, mobile communications devices are now used to provide such functions as Internet capability and multimedia capability. Along with these increased functions has come the need to equip mobile communications devices with a camera in order to facilitate video/image communications through the reception and transmission of photographic images.

Efforts have been made to provide mobile communications devices with cameras which are capable of rotating about an axis in order to better provide the capability of capturing a photographic image while the user is still able to view the display screen of the communications device. The ability to position the camera to capture an image while still being able to view the display screen allows the user to continue communicating, via voice or data transmission, while the photographic image is captured.

One embodiment of a conventional mobile communications device equipped with a camera is illustrated in FIG. 1. The cellular telephone 1 includes main body 2 with a camera 3 fixedly mounted at an upper portion of the body. This telephone 1 does not allow the user to aim the camera 3 at an object with a desired angle without rotating the entire main body 2 since the camera lens is formed as an integral part of the telephone.

Because the camera 3 is always facing away from the LCD 4 and keypad 5 on the front of the main body 2, the user cannot aim the camera toward an object while viewing the LCD or keypad. Therefore, the user cannot use the LCD 4 like a viewfinder of a conventional camera in order to check the image of the intended object in the lens of the camera 3 before taking a picture. Furthermore, the user cannot use the keypad 5 to make a phone call while taking a picture.

A second embodiment of a conventional communications device equipped with a camera is illustrated in FIG. 2. The cellular telephone 6 includes a camera 7 rotatably installed in an upper portion of a main body 8. Although the camera 7 may be rotated with respect to the main body 8 and the LCD 9, the rotation is limited. For example, the camera 7 may only be rotated in the vertical axis (up and down) and with limited angles from which to photograph an object without rotating the entire main body 8. Furthermore, since the camera 7 sticks out on the edge of the main body 8, the lens is exposed and easily damaged or contaminated.

A third embodiment of a conventional communications device equipped with a camera is illustrated in FIG. 3. The cellular telephone 10 includes a camera 11 mounted at an upper end of a main body 12. The camera 11 rotates only on a horizontal axis (side-to-side). Because the user cannot rotate the camera 11 on a vertical axis (front to back) with respect to the main body 1, the camera 10 provides only limited angles from which to photograph an object without rotating the entire main body 12. Like the previous embodiment, the lens of the camera 11 may be easily damaged or contaminated.

A fourth embodiment of a conventional mobile communications device equipped with a camera includes a main body, a folder portion capable of being opened and closed at a hinge portion, an LCD on the folder portion, and a camera rotatably installed at a bushing in the middle of the hinge portion. The camera includes a cylindrically shaped camera housing, a camera lens installed in the camera housing, and a flexible printed circuit board (FPCB) connected to the camera lens.

In use, the rotation angle of the camera is controlled by frictional force generated between the bushing and the camera housing. When the camera is rotated, the FPCB is wound on the camera housing.

Although the camera in the fourth embodiment may be rotated significantly with respect to the LCD and the camera lens may be protected by the location of the camera in the bushing, the wound FPCB tends to cause the camera housing to rotate, therefore preventing the user from precisely adjusting the camera to a desired angle without rotating the entire telephone. Furthermore, the position of the camera is held only by friction and, therefore, may be susceptible to change through the movement of the telephone or rotation of the foldable portion about the hinge portion.

Attempts have been made to provide a mechanism for precisely adjusting and maintaining the position of camera with respect to a mobile communications device in which it is rotatably mounted. However, the user is still limited in the degree of variation with which he can adjust the camera angle and still have the chosen angle maintained until it is desired to adjust it further.

Therefore, there is a need for a mobile communications device equipped with a camera that enables the user to precisely aim the camera at an object to be photographed with a desired angle with respect to the body of the device and the adjusted position of the camera to be maintained until the user deliberately changes it. The present invention addresses these and other needs.

SUMMARY OF THE INVENTION

The present invention is directed to a camera that is mountable in a mobile communications device and that allows the user of the device to precisely adjust the angle of the camera with respect to the body of the device and maintains the adjusted angle of the camera until the user deliberately adjusts it again.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a camera that is mountable in a mobile communications device and that allows the user of the device to precisely adjust the angle of the camera with respect to the body of the device and maintains the adjusted angle of the camera until the user deliberately adjusts it again. Specifically, engaging members are provided on a camera holding apparatus and the portion of the device to which the camera-holding apparatus is mounted, the engaging members cooperating to allow acute-angle adjustment of the camera holding apparatus with respect to the body of the device and releasable secure the adjusted position of the camera holding apparatus such that is does not change in the absence of external force, for example additional adjustment by the user.

In one aspect of the invention, a camera apparatus is provided for mounting on a mobile communications device. The camera apparatus includes a mounting fixture, a camera holding fixture, and a rotation angle fixing means.

The mounting fixture is adapted to be coupled to the mobile communications device such that it is stationary with respect to the device. The camera holding fixture is adapted to hold a camera and be rotatably coaxially coupled to the mounting fixture such that the rotational position of the camera may changed with respect to the communications device. The rotation angle fixing means is adapted to allow acute rotational angle adjustment of the angle of rotation between the camera holding fixture and the body of the mobile communications device and to releasably maintain the adjusted position in the absence of an external force such as the user further adjusting the rotation angle.

As used herein, the term "acute rotational angle adjustment" refers to very slight adjustments in the relative position between two objects through a full range of angles, such as an angle of adjustment less than 25° through more than 180° of rotational angle adjustment. For example, it is contemplated that the camera holding fixture may be rotated such that the angle between the camera and the body of the mobile communications device is between 0° and 270° and the rotation angle fixing means may facilitate adjusting the camera holding fixture in increments of less than 25° through the entire 270° of rotational angle adjustment.

It is contemplated that at least a portion of the rotation angle fixing means may be integrally constructed with either the mounting fixture or camera holding fixture. Preferably, the rotation angle fixing means includes a serration portion having grooves and at least one protruding portion such that the protruding portion engages the grooves of the serration portion when the user adjusts the rotational position of the camera holding fixture such that the protruding portion prevents further movement of the camera holding fixture in the absence of additional force applied thereto. It is further contemplated that the serration portion may be located on the mounting fixture and the protruding portion on the camera holding fixture, or vise-versa.

It is contemplated that the protruding portion may be adapted to be flexible such that if may move slightly with respect to the mounting fixture or camera holding fixture on which it is located. It is further contemplated that the mounting fixture may be integrally constructed as part of the mobile communications device. Preferably, the mounting fixture is a bushing member and the protruding portion includes a plate spring.

In another aspect of the invention, a mobile communication device equipped with a camera is provided. The mobile communications device includes a body, a bushing coupled to a side of the body and a camera module adapted to house the camera and coaxially coupled to the bushing such that it rotates at least partially therein. The bushing has a first engaging member and the camera module has a second engaging member such that the first engaging member and second engaging member cooperate to allow acute rotational angle adjustment of the position of the camera module with respect to the body and to releasably maintain the adjusted position in the absence of an external force such as the user further adjusting the rotation angle.

It is contemplated that first engaging member may be integrally constructed with the bushing or the second engaging member may be integrally constructed with the camera module. Preferably, one engaging member includes a serration portion having grooves and the other engaging member includes at least one protruding portion such that the protruding portion engages the grooves of the serration portion when the user adjusts the rotational position of the camera module such that the protruding portion prevents further movement of the camera module in the absence of additional force applied thereto.

It is contemplated that the protruding portion may be adapted to be flexible such that if may move slightly with respect to the bushing member or camera module on which it is located. It is further contemplated that the bushing may be integrally constructed as part of the mobile communications device Other features and advantages of the present invention will become apparent from the following detailed description when taken in conjunction with the accompanying drawings, which illustrate, by way of example, the principles of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
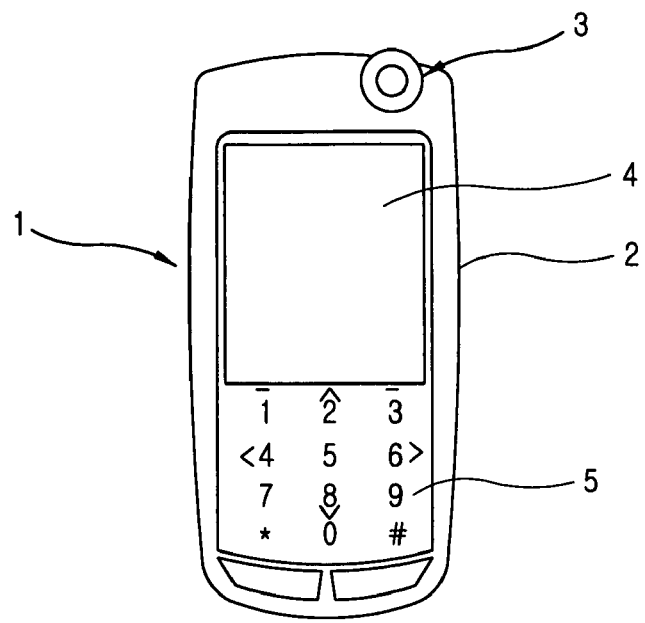
FIG. 1 is a front perspective view of a first embodiment of a conventional communication device equipped with a camera.
Figure 2:
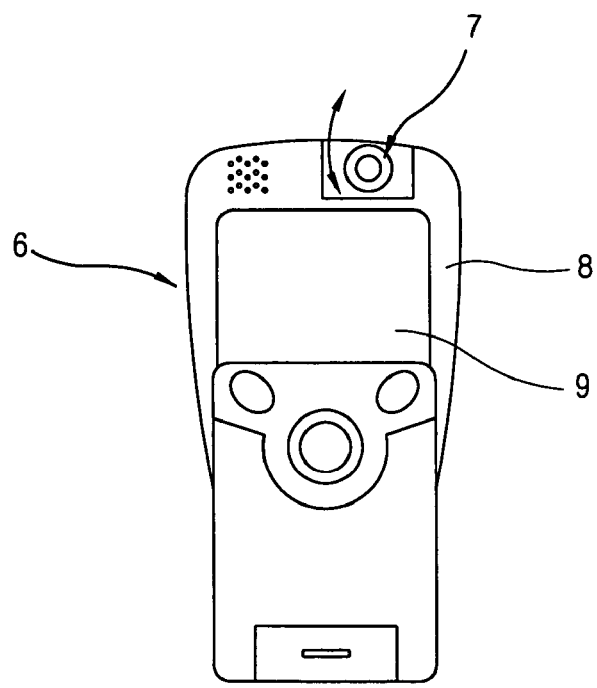
FIG. 2 is a front perspective view of a second embodiment of a conventional communication device equipped with a camera.
Figure 3:
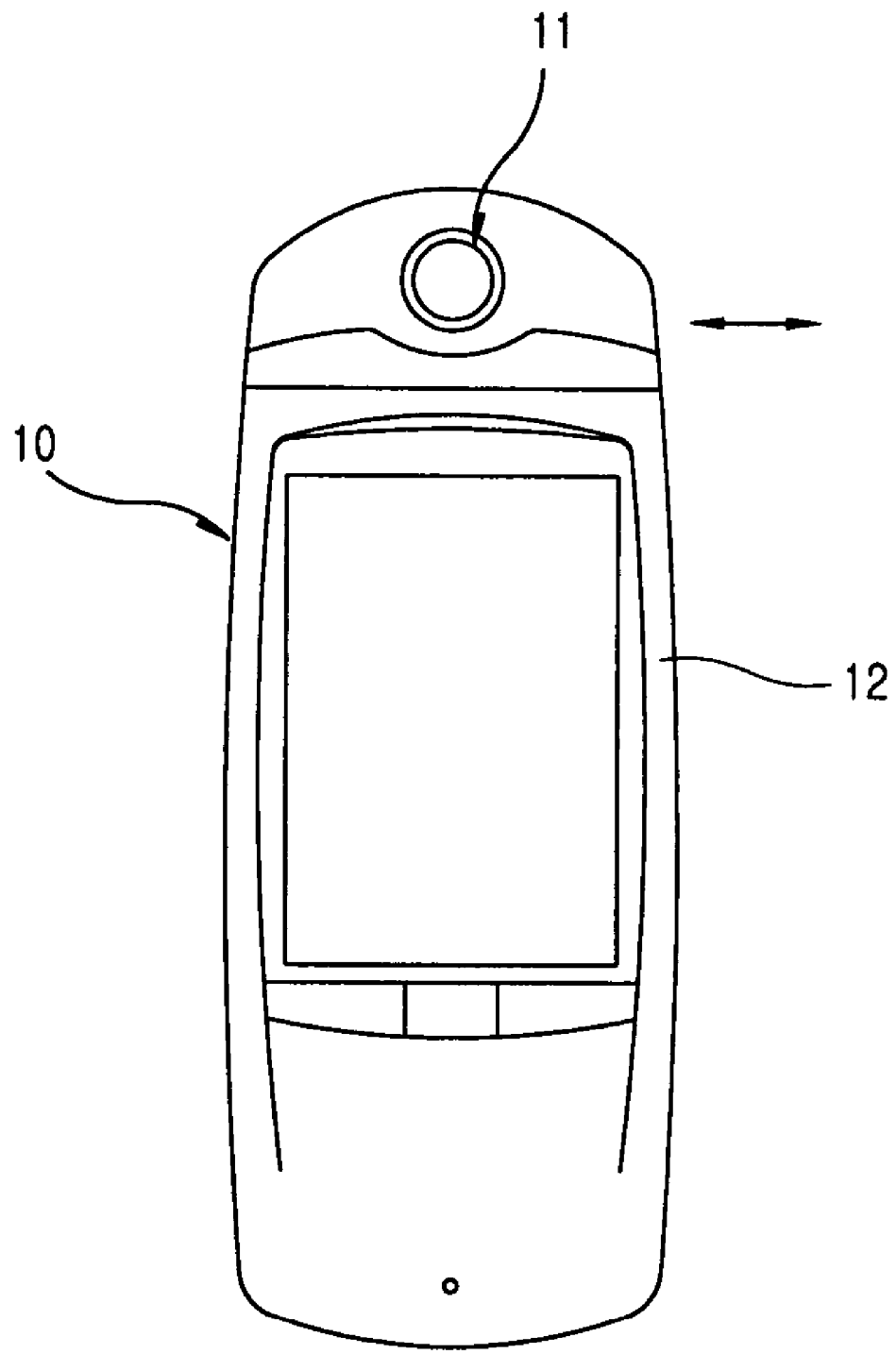
FIG. 3 is a front perspective view of a third embodiment of a conventional communication device equipped with a camera.
Figure 4:
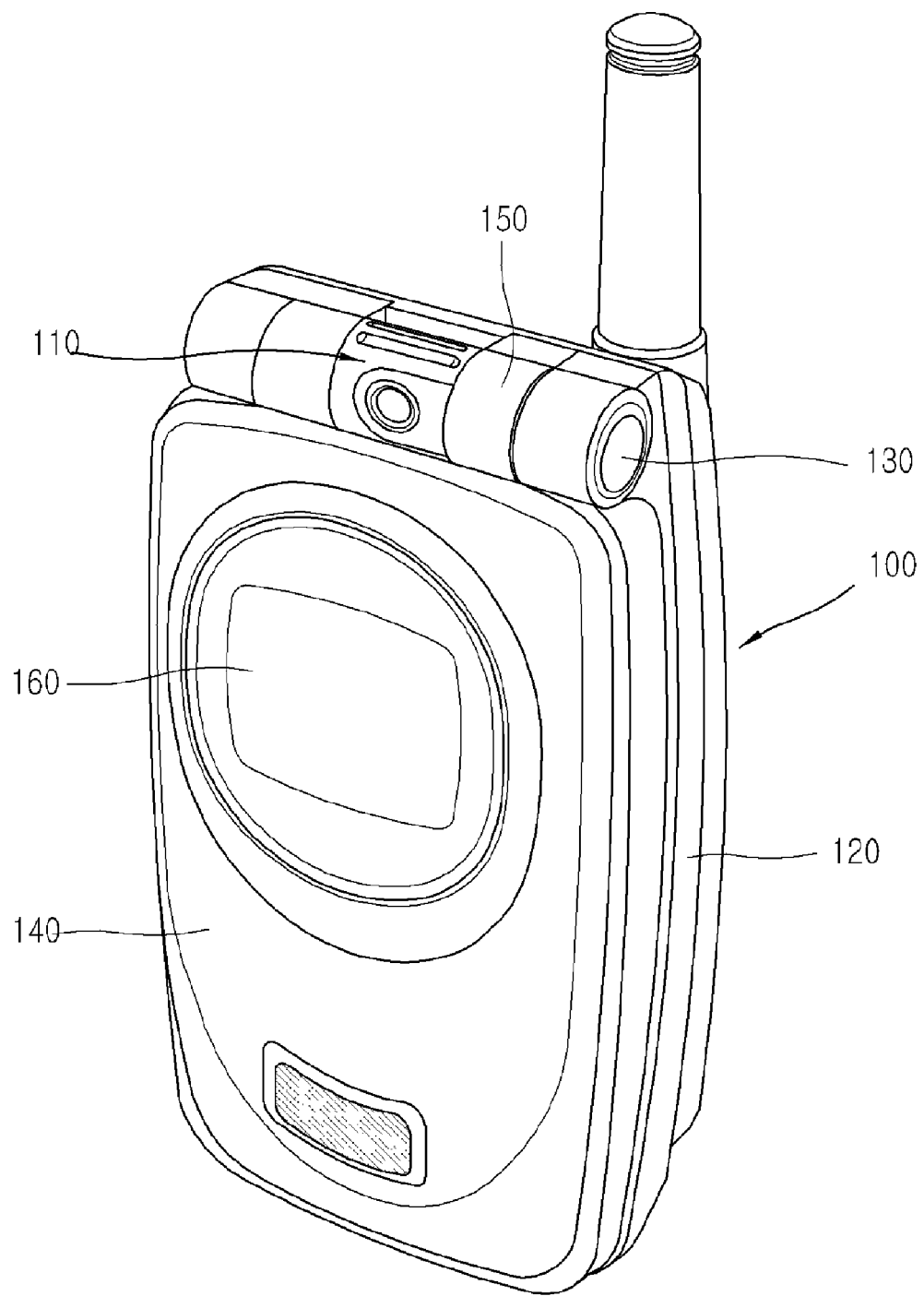
FIG. 4 is a front perspective view of a first embodiment of a mobile communications device equipped with a camera in accordance with the present invention.

The present invention relates to a camera that is mountable in a mobile communications device and that allows the user of the device to precisely adjust the angle of the camera with respect to the body of the device and maintains the adjusted angle of the camera until the user deliberately adjusts it again. Although the present invention is illustrated with regard to a folder-type cellular phone, it is contemplated that the present invention may be utilized with any type or configuration of mobile communication device (for example, PDA or notebook with wireless communication capabilities) or anytime it is desired to provide photographic capabilities for a communications device while allowing the angle of the camera to be precisely adjusted and maintained.

As used herein, the term "acute rotational angle adjustment" refers to very slight adjustments in the relative position between two objects through a full range of angles, such as an angle of adjustment less than 25° through more than 180° of rotational angle adjustment.

Referring to FIGS. 4-8, one embodiment of the present invention is illustrated. The mobile communications device 100 includes a main body 120, a folder portion 140 capable of being opened and closed at a hinge portion 130, an LCD 160 on the folder portion, a camera 110 rotatably installed at a bushing 150 in the middle of the hinge portion, and a rotation angle fixing means.

Figure 5:
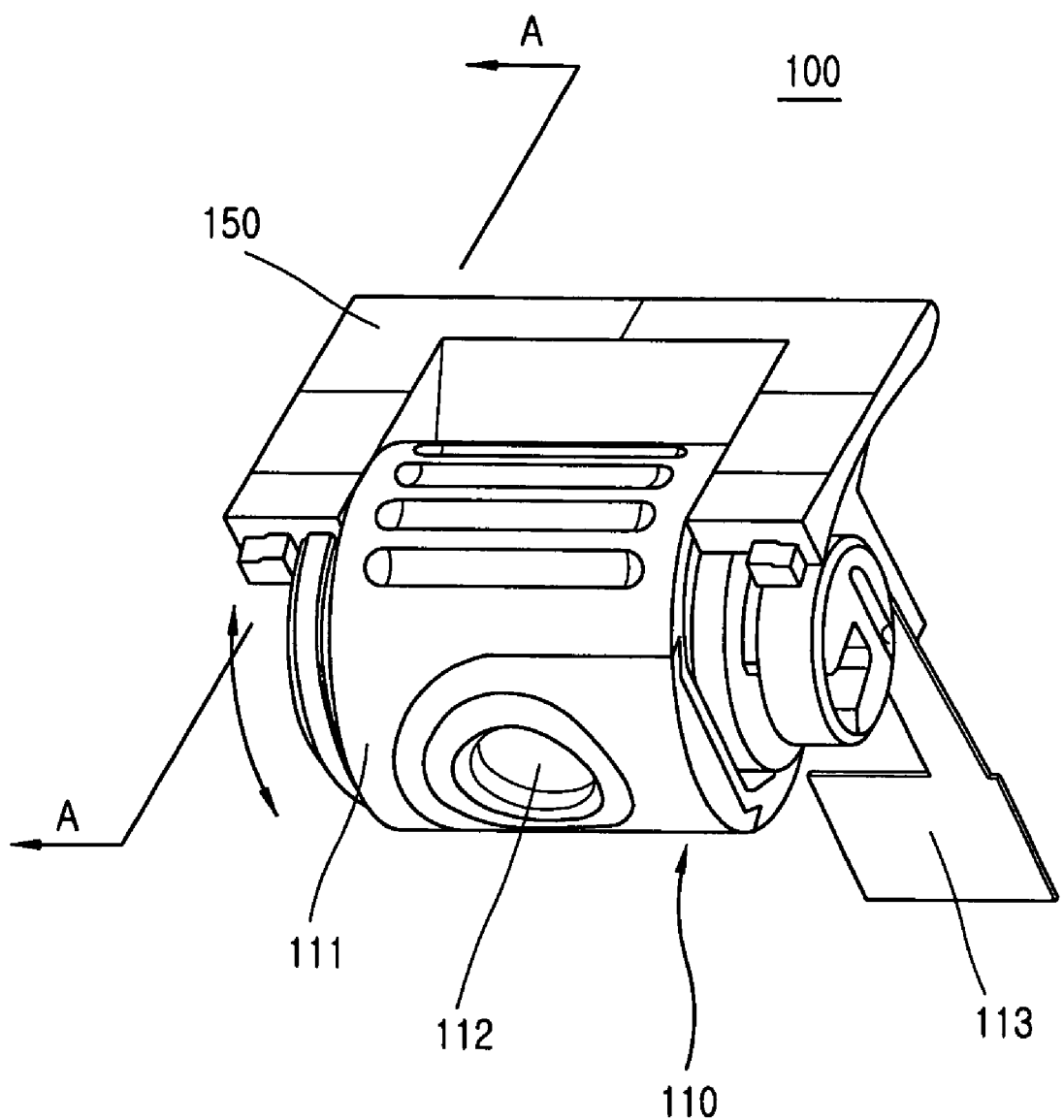
FIG. 5 is a partial perspective view of the communication device illustrated in FIG. 4 showing the camera module and a portion of the bushing.
Figure 6:
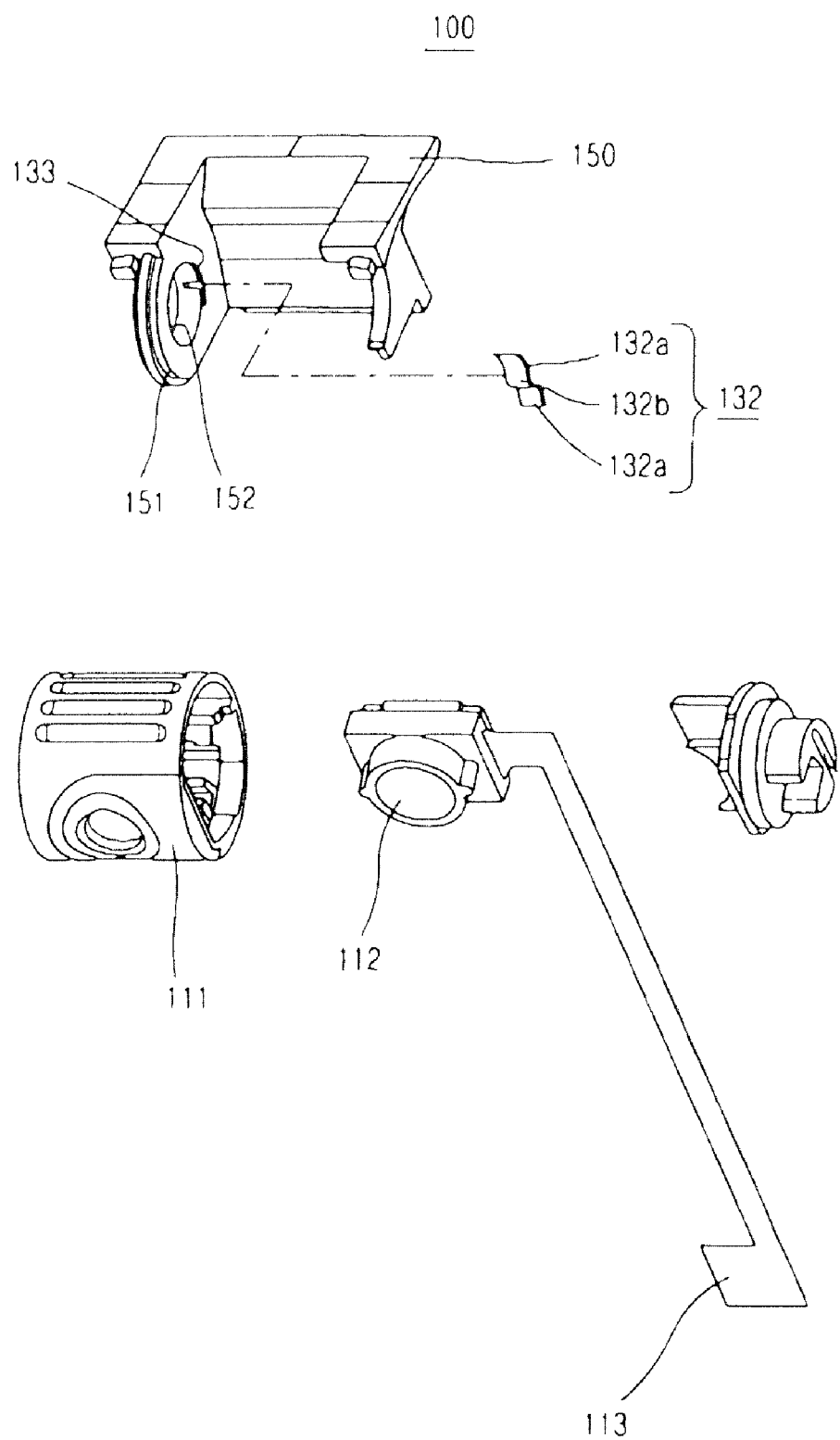
FIG. 6 is a disassembled perspective view of FIG. 5.
Figure 7:
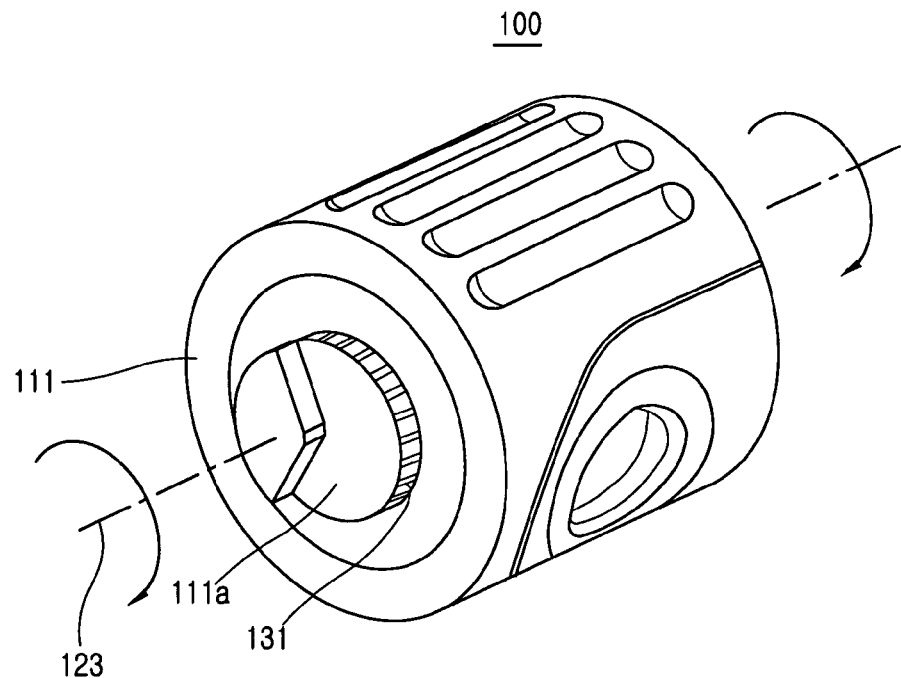
FIG. 7 is a front perspective view of the camera module illustrated in FIG. 5.

As illustrated in FIG. 5, the camera 110 includes a cylindrically shaped camera module 111, a camera lens 112 installed in the camera module, and a flexible printed circuit board (FPCB) 113 connected to the camera lens. The camera module 111 has a rotation axis 123 at the center thereof and a rotation axis member 111a extending therethrough. A supporting member 151 with an aperture 152 for inserting and supporting the rotation axis member 111a is formed at both sides of the bushing 150.

As illustrated in FIGS. 5-9, the rotation angle fixing means includes a serration portion 131 having multiple grooves at an outer circumferential surface of the rotation axis member 123 of the camera module 111 and a protrusion 132 adapted to contact the serration portion at an inner portion of the bushing 150. An insertion groove 133 adapted to hold the protrusion 132 in place is provided at one inner side of the bushing 150. The protrusion 132 has fixed portions 132a on either side of a contact portion 132b, the contact portion adapted to contact the serration portion 131.

Figure 8:
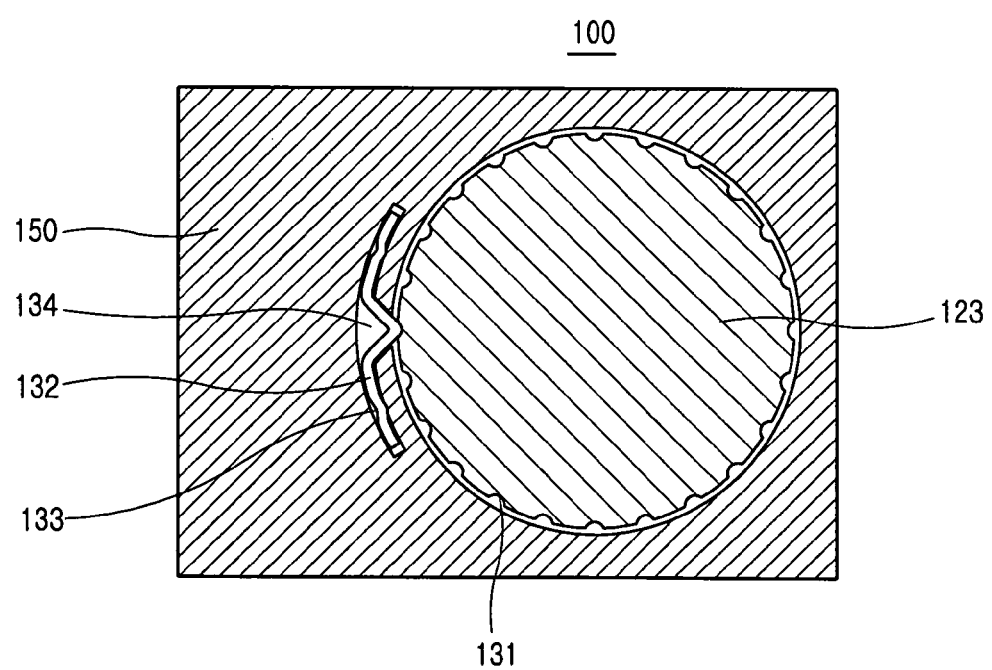
FIG. 8 is a sectional view taken along line A-A of FIG. 5.

As illustrated in FIG. 8, the shape of the protrusion 132 is such that when it is held in the insertion groove 133, a space 134 is created behind the contact portion 132b. The space 134 allows the contact portion 132b to be displaced slightly with respect to the bushing 150, thereby enabling the contact portion to flexibly contact the grooves in the serration portion 131 and transition more smoothly between successive grooves.

Preferably, the protrusion 132 is an elastic stopping member and the fixed portions 132a are plate springs attached to the bushing 150 by being inserted into the insertion groove 133. It is contemplated that the bushing 150 may be integrally constructed with the hinge portion 130. It is further contemplated that the protrusion 132 may be integrally constructed with the bushing 150. Moreover, it is contemplated that the camera module 111 may be located to either side at the hinge portion 130 rather than in the middle.

When the user rotates the camera module 111 to adjust the photographing angle of the camera 110, the FPCB 113 is wound on the camera module. However, since the contact portion 132b of the protrusion 132 is in contact with the serration portion 131, the rotation angle of the camera 110 can be maintained as adjusted by the user in spite of the tendency of the FPCB to cause the camera module to rotate.

The rotation angle of the camera 110 may be maintained as adjusted by the user until the user again applies force to the camera module 111 in order to readjust the photographing angle of the camera. The multiple grooves of the serration portion 131 allow acute rotational angle adjustment of the camera 110 with respect to the main body 120 and folder portion 140 of the mobile communications device 100. As illustrated in FIG. 8, the grooves of the serration portion 131 extend about the full 360° outer circumferential surface of the rotation axis member 123 of the camera module 111 with the increment between any two successive grooves being less than 25°.

Figure 9:
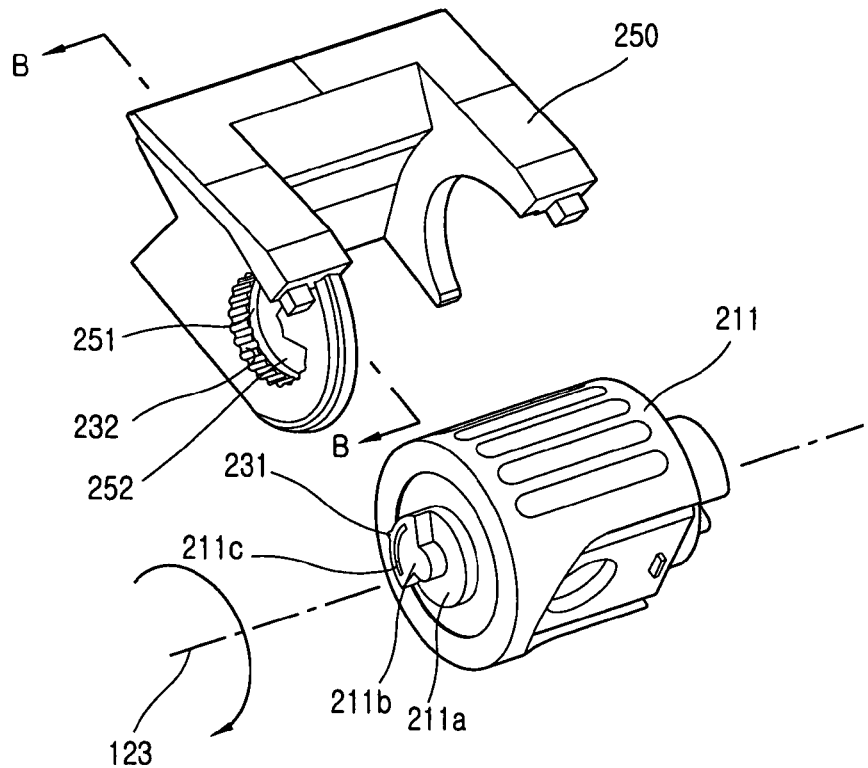
FIG. 9 is a disassembled partial perspective view of the camera module and a portion of the bushing of a second embodiment of a mobile communications device equipped with a camera in accordance with the present invention.
Figure 10:
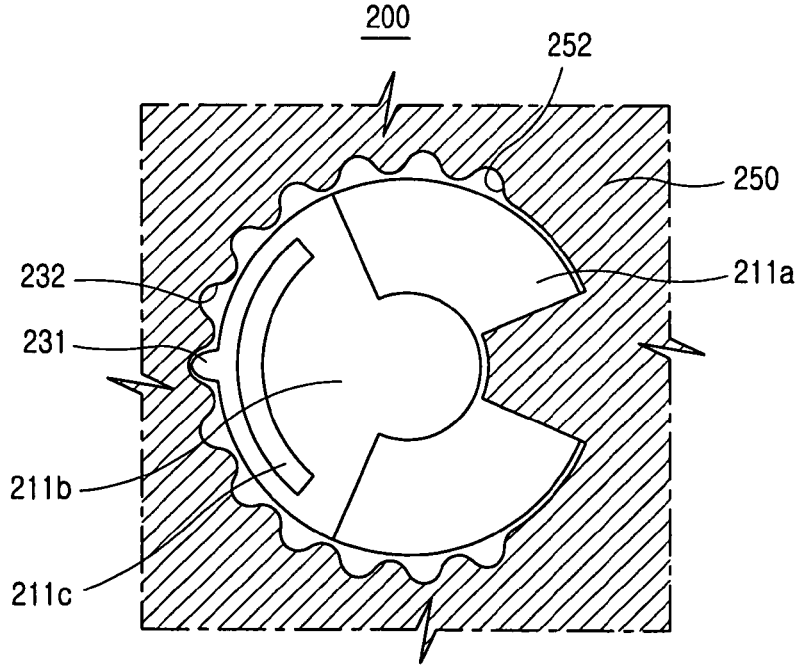
FIG. 10 is a sectional view taken along line B-B of FIG. 9.

Referring to FIGS. 9 and 10, a second embodiment of the present invention is illustrated. The mobile communications device 200 is similar to the device illustrated in FIGS. 4-8, with several distinctions.

In the embodiment illustrated in FIGS. 9 and 10, the rotation angle fixing means includes a serration portion 232 having multiple grooves at an inner surface of the bushing 250 and a protrusion 231 at an outer surface of the camera module 211, the protrusion adapted to contact the serration portion. The serration portion 232 is formed on the inner circumferential surface of the aperture 252 in the supporting member 251 of the bushing 250 and the protrusion 231 extends from a stopper 211b formed at the outer circumferential surface of the rotation axis member 211a of the camera module 211. As illustrated in FIG. 10, the grooves of the serration portion 131 extend more than 180° around the inner circumferential surface of the aperture 252 in the supporting member 251 of the bushing 250 with the increment between any two successive grooves being less than 25°.

A relief slot 211c may be formed on the stopper 211b behind the protrusion 231 such that the protrusion may be displaced slightly with respect to the bushing 250, thereby enabling the protrusion to flexibly contact the grooves in the serration portion 131 and more smoothly transition between successive grooves. The slot 211c is formed along a circumferential direction of the rotation axis member 211a.

It is contemplated that the bushing 250 may be integrally constructed with the hinge portion 130. It is further contemplated that the protrusion 231 and stopper 211b may be integrally constructed with the rotation axis member 211a.

Figure 11:
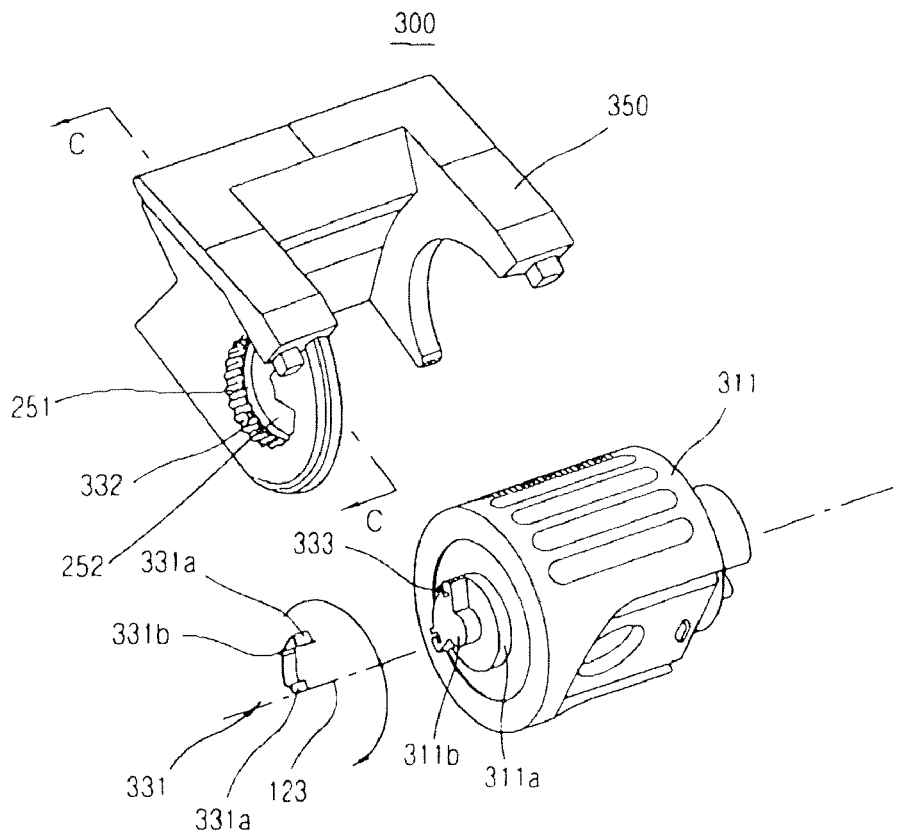
FIG. 11 is a disassembled partial perspective view of the camera module and a portion of the bushing of a third embodiment of a mobile communications device equipped with a camera in accordance with the present invention.
Figure 12:
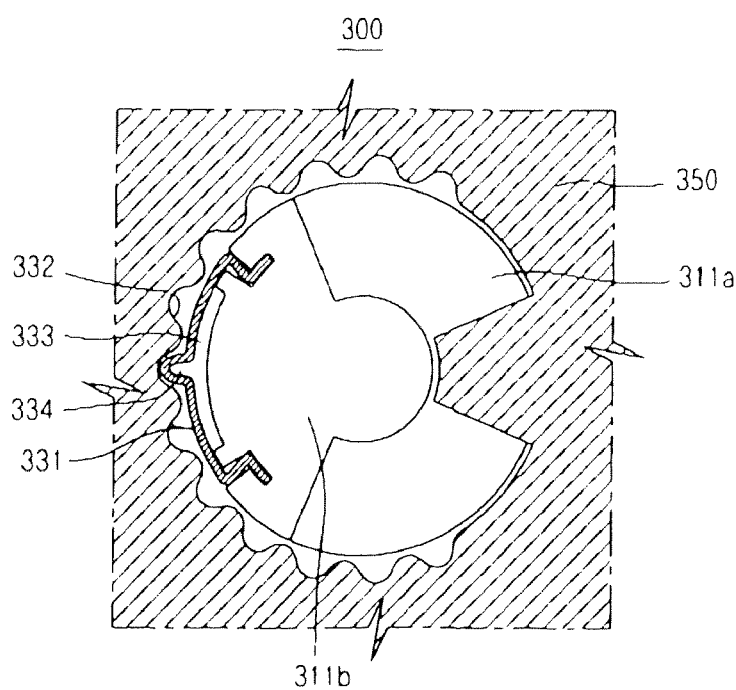
FIG. 12 is a sectional view taken along line C-C of FIG. 11.

Referring to FIGS. 11 and 12, a third embodiment of the present invention is illustrated. The mobile communications device 300 is similar to the device illustrated in FIGS. 9 and 10, with several distinctions.

In the embodiment illustrated in FIGS. 11 and 12, the rotation angle fixing means includes a serration portion 332 having multiple grooves at an inner surface of the bushing 350 and a protrusion 331 at an outer surface of the camera module 311, the protrusion adapted to contact the serration portion. The serration portion 332 is formed on the inner circumferential surface of the aperture 352 in the supporting member 351 of the bushing 350 and the protrusion 331 extends from a stopper 311b formed at the outer circumferential surface of the rotation axis member 311a of the camera module 311.

Insertion grooves 333 adapted to hold the protrusion 332 in place are provided at a side circumferential surface of the stopper 311b. The protrusion 331 has fixed portions 331a on either side of a contact portion 331b, the contact portion adapted to contact the serration portion 332.

As illustrated in FIG. 12, the shape of the protrusion 331 is such that when it is held in the insertion grooves 333, a space 334 is created behind the contact portion 331b. The space 334 allows the contact portion 331b to be displaced slightly with respect to the bushing 350, thereby enabling the contact portion to flexibly contact the grooves in the serration portion 332 and transition more smoothly between successive grooves.

Preferably, the protrusion 331 is an elastic stopping member and the fixed portions 331a are plate springs attached to the bushing 350 by being inserted into the insertion grooves 333. It is contemplated that the bushing 350 may be integrally constructed with the hinge portion 130. It is further contemplated that the protrusion 331 and stopper 311b may be integrally constructed with the rotation axis member 311a.

Referring to FIGS. 13-16, a fourth embodiment of the present invention is illustrated. The mobile communications device 400 is similar to the device illustrated in FIGS. 13 and 14, with several distinctions.

Figure 13:
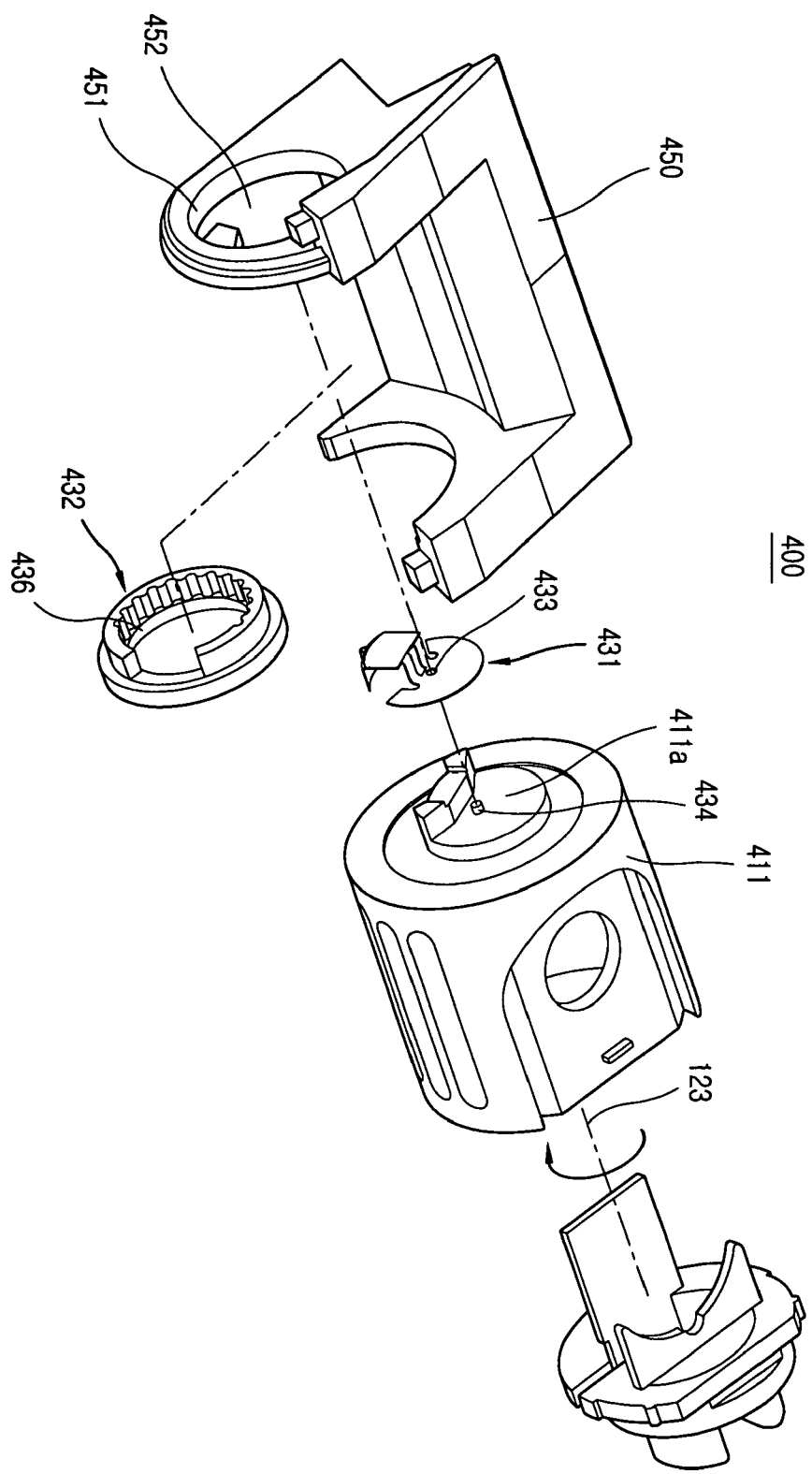
FIG. 13 is a disassembled partial perspective view of the camera module and a portion of the bushing of a fourth embodiment of a mobile communications device equipped with a camera in accordance with the present invention.

As illustrated in FIG. 13, the rotation angle fixing means includes a serration member 432 having multiple grooves attached to an inner surface of the bushing 450 and a protrusion member 431 attached to an outer surface of the camera module 411, the protrusion member adapted to contact the serration member. The serration member 432 is attached to the inner circumferential surface of the aperture 452 in the supporting member 451 of the bushing 450. The protrusion member 431 is attached to the outer circumferential surface of the rotation axis member 411a of the camera module 411.

An insertion hole 433 is provided in the protrusion member 431 and a fixing protrusion 434 is provided at an outer circumferential surface of the rotation axis member 411a of the camera module 411. The insertion hole 433 is adapted to receive the fixing protrusion 434 in order to secure the protrusion member 431 to the camera module 422.

As best illustrated in FIG. 13, the serration member 432 is formed as a ring having grooves along an inner circumferential surface and a smooth portion 436 to prevent axial movement of the camera module 411. The serration member 432 is fitted into and secured in the aperture 452 in the supporting member 451 of the bushing 450. Preferably, the serration member 432 is formed of a material that is resistant to wear, for example metal or plastic. As illustrated in FIG. 13, the grooves of the serration member 432 extend more than 180° around the inner circumferential surface of the ring with the increment between any two successive grooves being less than 25°.

Figure 15:
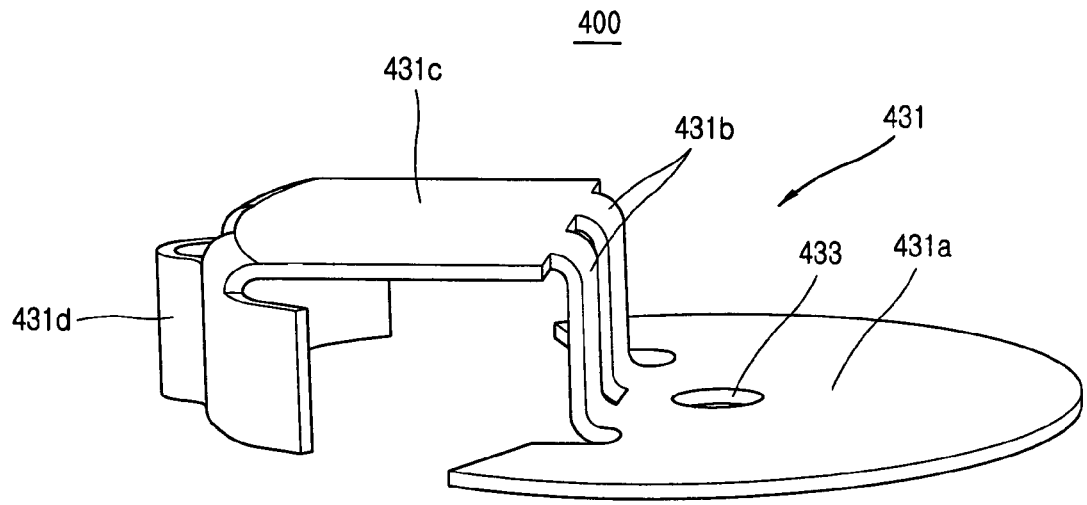
FIG. 15 is a perspective view showing the protrusion member illustrated FIG. 13.
Figure 16:
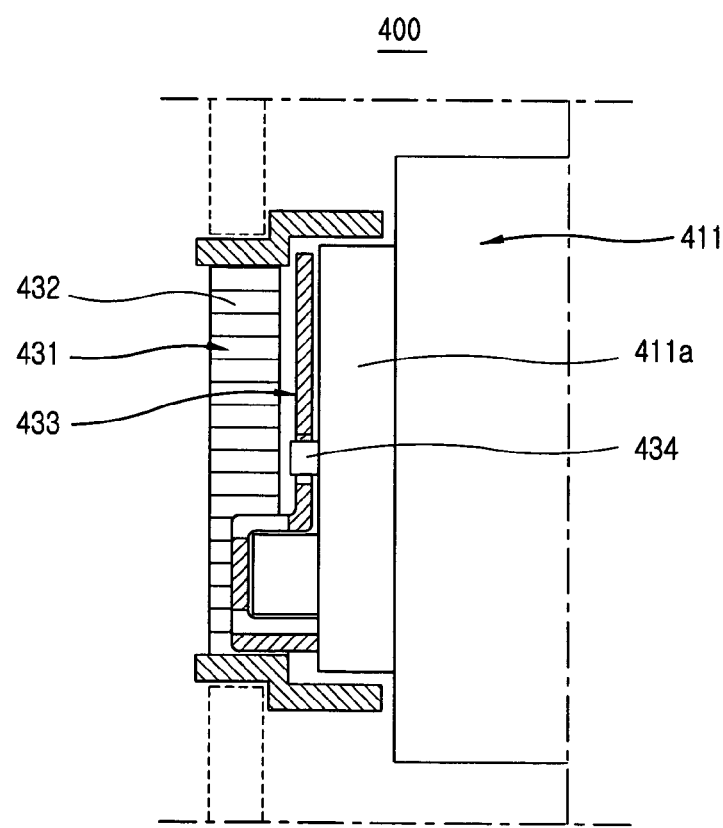
FIG. 16 is a sectional view taken along line D-D of FIG. 14.

As best illustrated in FIG. 15, the protrusion member 431 has a fixed portion 431a, an extending portion 431b, a supporting portion 431c, and a contact portion 431d. The fixed portion 431a contains the insertion hole 433 and is attached to the rotation axis member 411a. Preferably, the protrusion member 431 is made at least partially of metal.

The extending portion 431b extends away from the fixed portion 431a in the plane of the rotation axis 123. The supporting portion 411c is curvedly formed from the extending portion 431b. The contact portion 431d extends from the extending portion 431c and contacts the grooves of the serration member 432.

Figure 14:
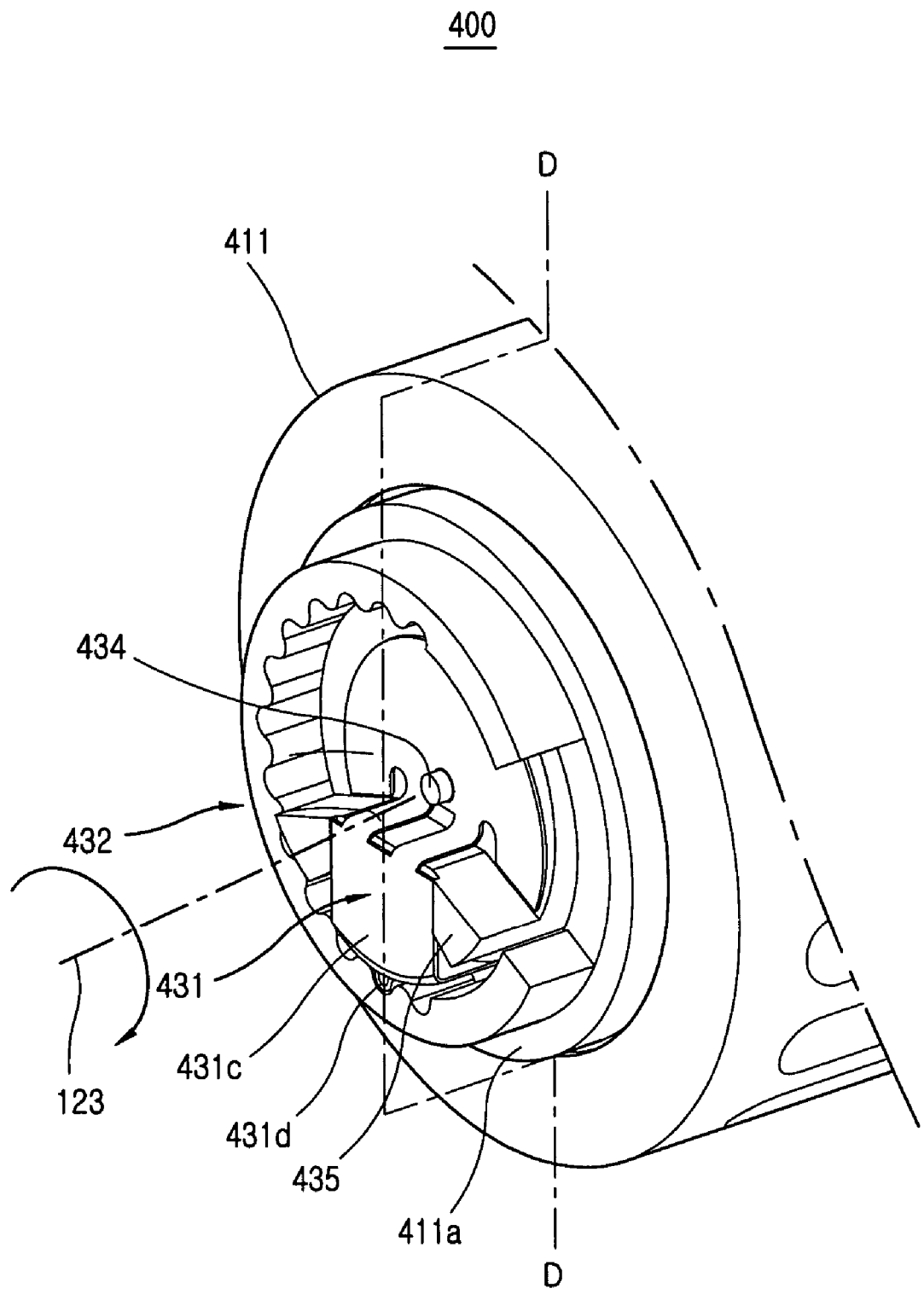
FIG. 14 is a perspective view showing a coupling between the serration member and protrusion member illustrated in FIG. 13.

As best illustrated in FIG. 14, the supporting portion 431c of the protrusion member 431 fits over a supporting portion 435 of the rotation axis member 411a and imparts flexibility to the contact portion 431d of the protrusion member. The flexibility imparted to the contact portion 431d allows the contact portion to be displaced slightly in the plane perpendicular to the rotation axis 123, thereby enabling the contact portion to flexibly contact the grooves in the serration member 432 and transition more smoothly between successive grooves.

Preferably, the protrusion member 431 is an elastic stopping member. It is contemplated that the bushing 450 may be integrally constructed with the hinge portion 130. It is further contemplated that the protrusion member 431 may be integrally constructed with the rotation axis member 411a.

Figure 17:
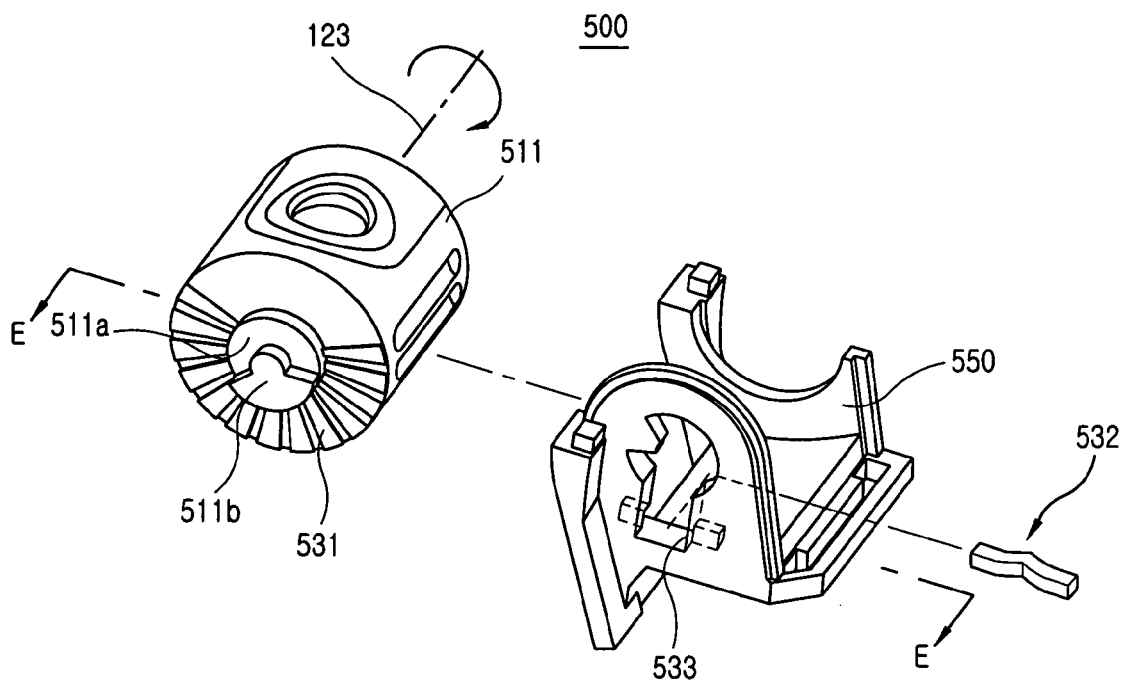
FIG. 17 is a disassembled partial perspective view of the camera module and a portion of the bushing of a fifth embodiment of a mobile communications device equipped with a camera in accordance with the present invention.
Figure 18:
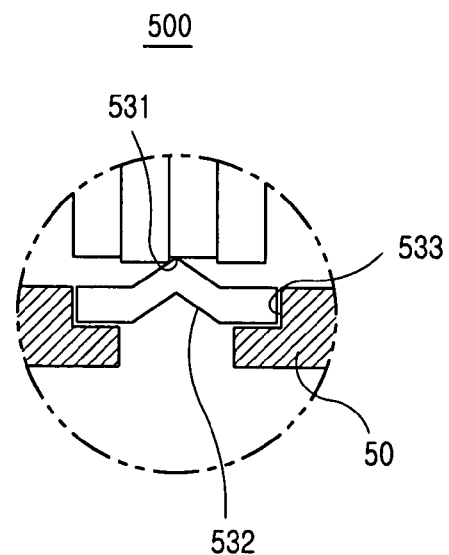
FIG. 18 is a sectional view taken along line E-E of FIG. 17.

Referring to FIGS. 17 and 18, a fifth embodiment of the present invention is illustrated. The mobile communications device 500 is similar to the device illustrated in FIGS. 4-8, with several distinctions.

As illustrated in FIG. 17, the rotation angle fixing means includes a serration portion 531 having multiple grooves at an external surface of the camera module 511 and a protrusion 532 at an inner surface of the bushing 550, the protrusion adapted to contact the serration portion. The serration portion 532 is formed on an outer circumferential surface of the camera module 511 that is essentially perpendicular to the rotation axis 123 of the camera module. A stopper 511b formed at the outer circumferential surface of the rotation axis member 511a of the camera module 511. An insertion groove 533 adapted to hold the protrusion 532 in place is provided at one inner side of the bushing 550. As illustrated in FIG. 17, the grooves of the serration portion 531 extend more than 180° around the outer circumferential surface of the camera module 511 with the increment between any two successive grooves being less than 25°.

Preferably, the protrusion 532 is formed of a flexible material such that the protrusion may be displaced slightly with respect to the bushing 550, thereby enabling the protrusion to flexibly contact the grooves in the serration portion 531 and more smoothly transition between successive grooves. It is contemplated that the bushing 550 may be integrally constructed with the hinge portion 130. It is further contemplated that the protrusion 532 may be integrally constructed with the bushing 550.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structure equivalent but also equivalent structures.

What is claimed is:

1. A mobile communication device equipped with a camera, comprising:
   a main body having a first and a second hinge member;
   a folder body having a third and a fourth hinge member rotatably coupled to the first and the second hinge members respectively thereby coupling the main body to the folder body such that the mobile communication device may be in a folded or an open configuration;
   a mounting portion disposed between the third and the fourth hinge members, and having a first engaging member; and
   a camera module coaxially coupled to the mounting portion such that it rotates at least partially therein about a rotation axis, the camera module adapted to house the camera and having a second engaging member;
   wherein the first engaging member and second engaging member cooperate to allow acute rotational angle adjustment of the camera module with respect to the main body such that the camera module may be releasably secured at the adjusted rotation angle in the absence of an external force applied thereto, and
   wherein the camera module has at least one groove disposed on an outer surface thereof for manipulating a rotational direction of the camera module.

2. The device of claim 1, wherein the mounting portion is integrally constructed with the main body.

3. The device of claim 1, wherein the first engaging member is integrally constructed with the mounting portion.

4. The device of claim 1, wherein the second engaging member is integrally constructed with the camera module.

5. The device of claim 1, wherein the camera module further comprises a rotation axis member protruding therefrom, the rotation axis member rotatably engaging an aperture in the mounting portion.

6. The device of claim 5, wherein the first engaging member comprises a serration portion having grooves forming at least a partial ring about the inner circumferential surface of the aperture through the mounting portion and the second engaging member comprises at least one protrusion that extends from the rotation axis member of the camera module such that the at least one protrusion releasably engages the grooves of the serration portion, thereby releasably securing at the camera module at an acute angle.

7. The device of claim 6, wherein the at least one protrusion is flexible such that it may move slightly relative to the camera module.

8. The device of claim 5, wherein the second engaging member comprises a serration portion having grooves forming at least a partial ring about an external surface of the camera module and the first engaging member comprises at least one protrusion that extends from the bushing such that the at least one protrusion releasably engages the grooves of the serration portion, thereby releasably securing at the camera module at an acute angle.

9. The device of claim 8, wherein the at least one protrusion is flexible such that it may move slightly relative to the bushing.

10. The device of claim 8, wherein the second engaging member comprises a serration portion about an external circumferential surface of the camera module, the circumferential surface essentially perpendicular to the rotation axis of the camera module.

11. The device of claim 8, wherein the second engaging member comprises a serration portion about the outer circumferential surface of the rotation axis member of the camera module.

12. A mobile communication device equipped with a camera, comprising:
   A main body having a first and a second hinge member;
   a folder body having a third and a fourth hinge member rotatably coupled to the first and the second hinge members respectively thereby coupling the main body to the folder body such that the mobile communication device may be in a folded or an open configuration;
   a mounting portion disposed between the third and the fourth hinge members;
   a camera module having a rotation axis member extending therefrom and rotatably coupled to the mounting portion such that it rotates at least partially therein about a rotation axis, the camera module adapted to house the camera; and
   a rotation angle fixing means comprising a serration portion attached to an aperture through the mounting portion and a protruding portion attached to an external surface of the camera module rotation axis member, the serration portion having grooves forming at least a partial ring about the inner circumferential surface of the aperture and the protruding portion engaging grooves in the serration portion;
   wherein the rotation angle fixing means allows acute rotational angle adjustment of the camera module with respect to the device such that the adjusted rotation angle of the camera module is maintained in the absence of an external force applied thereto, and
   wherein the camera module has at least one groove disposed on an outer surface thereof for manipulating the rotational angle of the camera module.

* * * * *